Figure 1:
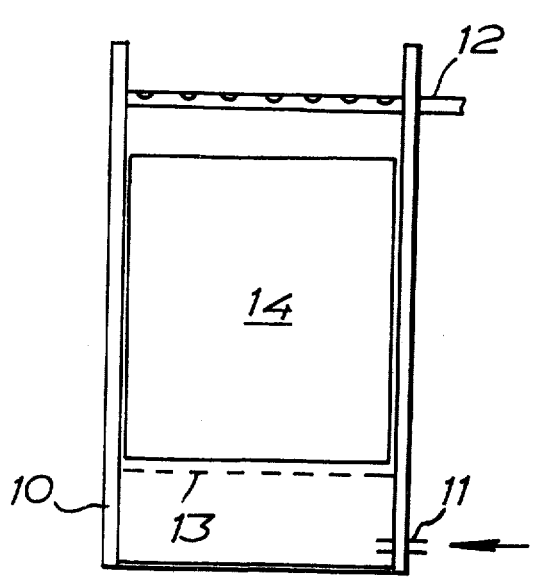

United States Patent [19]
Sparham

[11] 3,925,205
[45] Dec. 9, 1975

[54] METHOD OF SEPARATING SOLIDS SUSPENDED IN A LIQUID

[76] Inventor: Vaughan Reynell Sparham, 42 Church St., Great Budworth, Northwich, Cheshire, England

[22] Filed: July 2, 1969

[21] Appl. No.: 838,613

[52] U.S. Cl. .................. 210/73; 210/84; 210/521; 210/522
[51] Int. Cl.² ........................................ B01D 21/00
[58] Field of Search ................ 210/73, 84, 521, 522

[56] References Cited
UNITED STATES PATENTS

| | | | |
|---|---|---|---|
| 719,761 | 2/1903 | Delmouly | 210/522 X |
| 1,709,676 | 4/1929 | Martyn | 210/521 X |
| 3,482,694 | 12/1969 | Rice et al. | 210/73 |

FOREIGN PATENTS OR APPLICATIONS

| | | | |
|---|---|---|---|
| 994,118 | 11/1951 | France | 210/521 |
| 13,996 | 10/1887 | United Kingdom | 210/521 |

*Primary Examiner*—John Adee

[57] ABSTRACT

Colloidal or gelatinous solids suspended in a liquid, such as sewage, are separated by passing the liquid through a labyrinth of eddy-forming surfaces in series with a sheet perforate member. The labyrinth may be formed from plate-like or tube-like members arranged within a vessel having an inlet and an outlet for the liquid. The members have eddy forming surfaces and are arranged to form a labyrinth of passages through which the liquid must pass preferably in an upward direction, when flowing from the inlet to the outlet. The plate-like or tube-like members may have an undulating cross-section or ribbed walls to provide the eddy-forming surfaces. The labyrinth is preferably on the downstream side of the sheet perforate member.

14 Claims, 9 Drawing Figures

METHOD OF SEPARATING SOLIDS SUSPENDED IN A LIQUID

This invention relates to the flocculation and clarification of waters containing organic or inorganic impurities.

The suspended solids occurring in waste waters that have been subject to purification by a process of biological oxidation may contain as much as 300 parts per million of organic matter. Again, the waters emerging from the preparation of coal and minerals can contain sufficient fine particles in suspension to render these waters unfit for direct discharge to natural water courses. Effluents from these processes normally contain suspended solids which are, in a large proportion, separated from the water phase by simple sedimentation. Separation by this means, however, is seldom complete, and a proportion which may vary between 30 and 1500 parts per million according to the nature of the suspended solids may pass out with the final effluent to the receiving stream or water course. This is undesirable since these solids become attached to or deposited on live plants on the bed of a stream inhibiting photosynthesis and may even interfere with the free flow of the stream due to silting up in areas of low flow velocities. It is also possible that such suspended solids, may, in certain circumstances, constitute a loss of valuable material.

The permissible limits of suspended solids specified in Federal bye-laws has been based largely on the Royal Commission Standard of Great Britain of 30 parts per million but increasingly lower limits, such as 10 parts per million are being enforced. Among the various methods of improving the quality of effluents in respect of their suspended solids content are the following:

Where an adequate area of grassland on suitable soil is available, substantial removal of residual solids is effected by distribution of the effluent over the surface of the land so that it finally reaches the stream after a proportion of suspended solids has been adsorbed onto the leaf and stem surfaces of grass and other plants, and also a certain amount of filtration through the soil.

Another method employed has been to pass the effluent through micro-strainers before discharge. Micro-strainers consist essentially of woven wire gauze having very fine apertures from 5 microns upwards to say 100 microns, such apertures being of the same order of magnitude as the solids to be retained. For dealing with humus particles from sewage purification aperatures of about 35 microns are employed. Necessarily, they must be made of very fine wires and thus are relatively delicate and easily damaged. They are also expensive.

In operation the solids retained by micro-strainers must frequently be cleaned off to avoid blinding and suitable arrangements are made to effect this.

Recently what are termed "upward flow clarifiers" known also in the U.K. as "Banks Filters" have come into use for a similar purpose. They consist of a conventional sedimentation tank within which a bed of gravel of suitable grading, e.g. ¼ to ⅜ inches, often 6 inches deep, is supported by a horizontal perforated floor in such a position that liquor introduced below the perforated member passes up through the gravel bed and thence to an outlet weir. Reduction of suspended solids content in the final effluent to 10 parts per million or less can be achieved when operated under optimum conditions. Mechanical coagulation of the residual solids is said to occur during passage through the gravel, and the flocs so formed lodge in the interstitial spaces of the gravel or settle on its surface. The rate of flow through the bed is restricted preferably to 10–15 galls/per Sq. ft./hr. and as in consequence compression of the formed flocs is minimal, the bed remains permeable for comparatively long periods, though from time to time when the head loss approximates to about 1 inch, the accumulated solids are removed by backwashing in known manner. These beds may be mounted suitably either in the usual final sedimentation tank itself, or in separate tanks. The perforate floor of the bed must be of adequate strength to support the weight of the gravel which may have to span a considerable area. The perforations in the floor must be smaller than the lower sizes of gravel, e.g. with gravel graded ¼ to ⅜ inch perforations with a maximum dimension in one direction of 3/16 inch are suitable.

It is said that the action of these gravel- or pebble-bed clarifiers is a combination of flocculation, cavity sedimentation, and adsorbtion. All three of these effects are in part due to the acceleration of the flow of water passing through the interstices of the gravel bed. Subsequent deceleration combined with the variations of flow within the voids among the pebbles gives rise to flocculation of the small particles which will either come to rest in cavities amongst the pebbles in the bed or alternatively escape to the upper surface of the bed where the reduced velocity of flow will permit the newly-formed larger flocs to settle back onto the surface of the bed.

According to the present invention there is provided a method of separating colloidal or gelatinous suspended solids in a liquid phase that comprises passing the liquid through a labyrinth of eddy-forming surfaces in series with a sheet perforate member.

These surfaces may be made from, for example, (1) polyvinyl chloride, (2) resin-bonded fibrous materials, (3) suitably prepared metals, (4) linoleum, (5) timber, (6) asbestos sheets, (7) rubber, (8) cork and (9) ceramics.

The invention is useful to the sewage disposal art and may also be used in solids/liquid separation wherever it is required to remove similar small suspended particles from the liquid.

The eddy forming surfaces may in general be the surfaces of elements arranged to form the labyrinth, the arrangement being such that the liquid passes through passages formed between the elements. The passages preferably form zig-zag or non-linear paths through the labyrinth. The direction of flow in relation to gravitational forces can be arranged to suit the type of solids in suspension to be separated from the liquid phase.

The invention includes apparatus for reducing the solids content of a liquid phase containing colloidal or gelatinous suspended solids which comprises a vessel, such as a sedimentation tank, having an inlet and an outlet for the liquid, and a labyrinth having eddy-forming surfaces arranged in the vessel so that when liquid flows through the vessel from the inlet to the outlet it must pass through the passages in the labyrinth.

The labyrinth may be formed from closely spaced plate-like or tube-like members or elements which may be metallic or non-metallic, e.g. they may be made from any of the materials (1) to (9) indicated above.

The plate-like or tube-like members may have an undulating cross-section and may also have ribbed walls. The plate-like or tube-like members of the labyrinth may be secured together to form made-up units having a plurality of passages therein for the liquid. The passages may be inclined to one another and/or to the walls of the vessel and may be of constant or variable cross-section. Preferably, the labyrinth is arranged so that when liquid flows through the vessel from the inlet to the outlet, it passes through the labyrinth in a generally upward direction.

As indicated above, a sheet perforate member is arranged in series with the labyrinth so that when liquid flows from the inlet to the outlet, it also passes through the sheet perforate member. Preferably the labyrinth is on the downstream side of the sheet perforate member, that is to say liquid flowing through the vessel from the inlet to the outlet flows first through the sheet perforate member and then through the labyrinth. A sedimentation tank may be provided having a compartment positioned close to the top of the tank in such a way that liquid fed into the tank must pass upwardly through the compartment before it can pass out of the tank. By filling the compartment with the labyrinth e.g. the assembly of elements, the liquid can be clarified and a large proportion of the small particles can be retained on the walls and among the cavities in the labyrinth. In addition, as with the "Banks Filter", the labyrinth may be arranged in a tank separate from a sedimentation tank.

Alternatively, the labyrinth may be provided in a vertical wall positioned in a tank into which sewage effluent can be fed. The labyrinth is positioned relatively close to one of the walls and the wall containing the labyrinth is positioned so that sewage must flow through a perforate member before it can leave the tank. This embodiment may be modified by sloping the labyrinth from the vertical or horizontal. This sloping of the labyrinth will in some cases enhance the retention of fine particles due to gravitational forces by modification of the eddy current flow pattern.

Means may be provided to regulate the flow of liquid from the outlet of the vessel. The outlet may thus be in the form of a weir provided with a decanting tray of a selected length for regulating the flow of liquid. The liquid may flow over the rim of the decanting tray or the rim may be v-notched or castellated or the sides of the tray may be perforated to allow liquid to pass from the vessel into the tray at the outlet. Alternatively, the outlet may be provided with multiple offtakes. Such arrangements permit control of the weir speed and/or length of draw at the outlet or outlets of the vessel.

The efficiency of the invention can be augmented by the addition of coagulants or by the application of a suitable electrical potential where the labyrinth is constructed of a conducting material, provided that suitable insulation is arranged.

The effectiveness of an eddy flow separator must be considered in relation to overall tank design. Small particle separation is normally enhanced by passing a paddle slowly through turbid water. The eddy current separator provides a static paddle through which the water and certainly some of the suspended matter passes. It is therefore better that the design of the eddy current separator be considered in terms of the mechanics of flocculation, and the effect of this invention is to alter the hydraulics of a conventional sedimentation tank. A sedimentation tank for final settlement at a sewage works (where tertiary treatment is envisaged) must be considered in terms of surface/overflow ratio. The introduction of an eddy current separator into a sedimentation tank somewhat alters the hydraulic behaviour of the tank. The outlet from the tank is no longer in direct communication with its base. It is well known that wherever streamlines develop they will entrain solids with them. Consequently, the paths of fine particles may be modified by the presence of the separator before actually entering the labyrinth, due to the slight resistance to flow that will develop immediately prior to the passage of the liquid through the labyrinth. It now becomes clear that the effect of an eddy current separator is both to regulate flow patterns and also to create suitable eddy formation for the retention of fine particles within its interstices.

The instability of floc blankets in upward flow sedimentation tanks is a well known phenomenon. The eddy current separator will also act as a stabiliser for these floc blankets.

Figure 2:
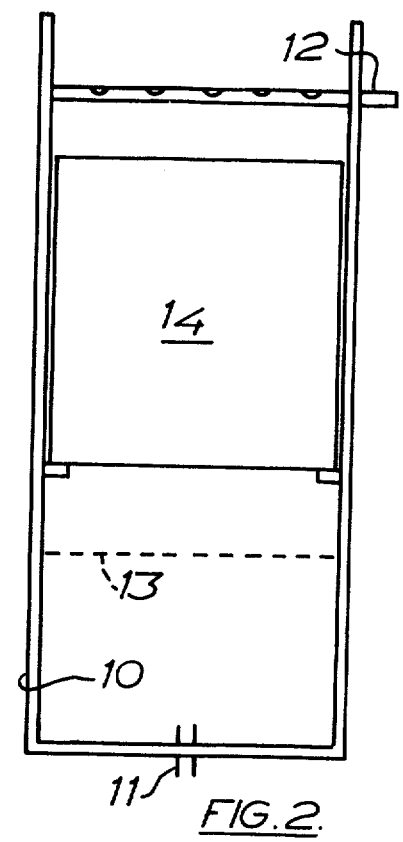
Figure 6:
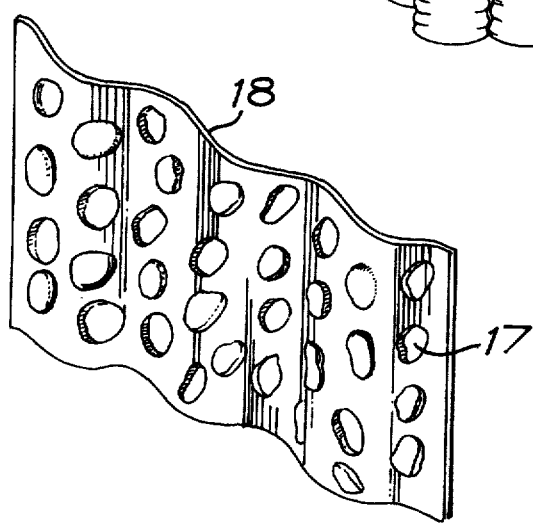
Figure 9:
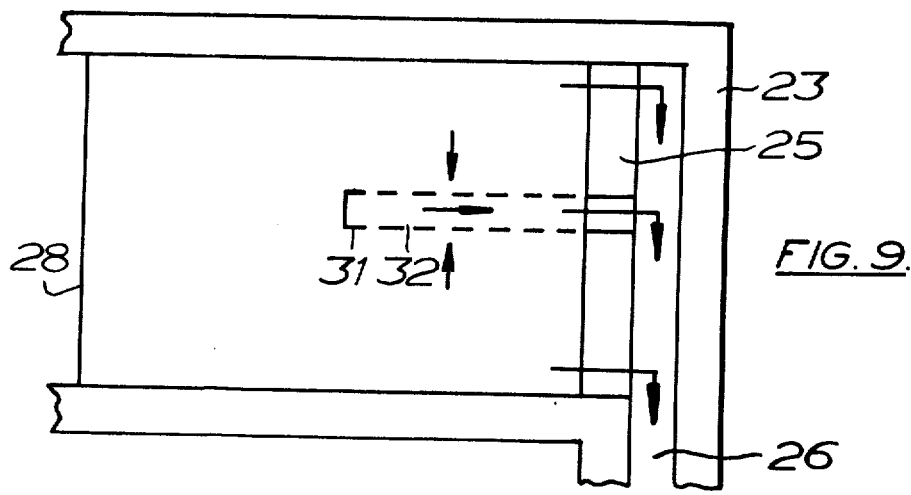
Figure 7:
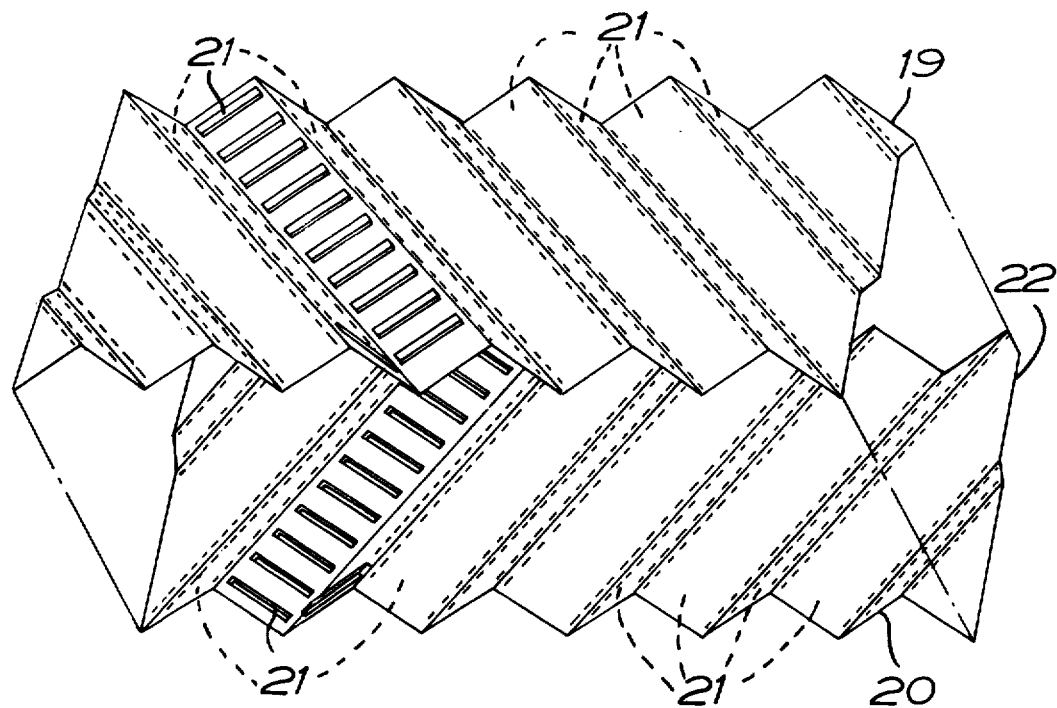
Figure 8:
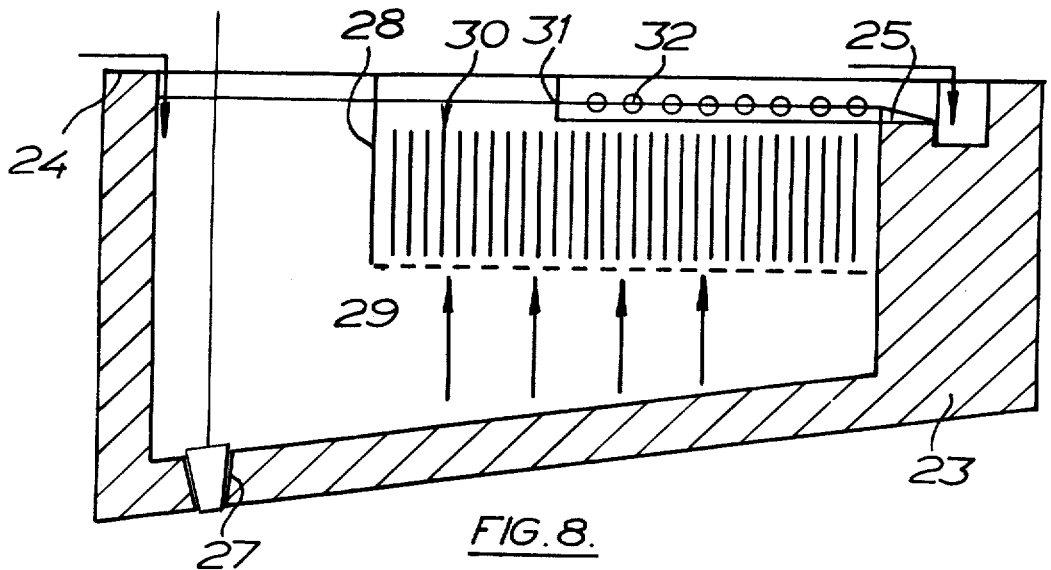

The invention will now be further described by way of example with reference to the accompanying drawings in which:

Each of FIGS. 1 and 2 is a side view of a pilot apparatus for sewage clarification, Each of FIGS. 3 to 7 is a perspective view of labyrinth-forming elements for the apparatus of FIGS. 1 and 2, FIG. 8 is a side view of a full scale apparatus for sewage clarification and FIG. 9 is a plan view of part of the apparatus shown in FIG. 8.

In each of FIGS. 1 and 2, a tank 10 is provided with an inlet 11 and an outlet 12 between which are a sheet perforate member 13 and a labyrinth generally indicated by 14. In FIG. 1, the labyrinth 14 rests on the perforate member 13 but in FIG. 2, there is a space between the member 13 and the base of the labyrinth 14. Liquid passing through the apparatus of FIG. 1 or FIG. 2 from the inlet 11 to the outlet 12 flows upwards in the tank 10 through the perforate member 13 and then through the labyrinth 14.

Figure 3:
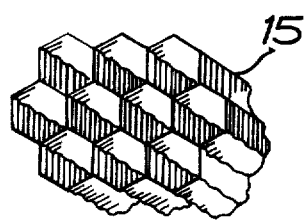
Figure 4:
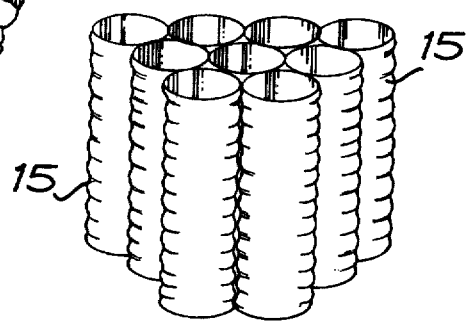

The labyrinth 14 may consist of tubes of any desired cross section, such as the tubes of hexagonal section shown in FIG. 3 or the tubes of circular section shown in FIG. 4, arranged so that the liquid flows upwards through the tubes, which have ribs or indentations 15. Alternatively, the labyrinth 14 may consist of undulating plates, such as those shown in FIGS. 5 and 6, arranged so that the liquid flows upwards between the plates, which have indentations or rugosities 16 and 17 respectively extending generally across the direction of flow along the plates. The edges 18 may be at the top of the labyrinth.

FIG. 7 shows a labyrinth in the form of a complete unit built up from plates 19 and 20, only two of which are shown in FIG. 7 for the sake of clarity, the rest of the unit being indicated by chain-dotted lines. The unit is built up of alternating plates 19 and 20. The plates are provided with angular corrugations, the peaks and valleys of the corrugations of the plate 19 running upwards to the left of the figure and the peaks and valleys of the plate 20 running upwards to the right of the figure. The entire surfaces of each plate are covered with rugosities or ribs 21. When the unit is positioned in the tank 10, the side 22 is approximately vertical.

Figure 5:
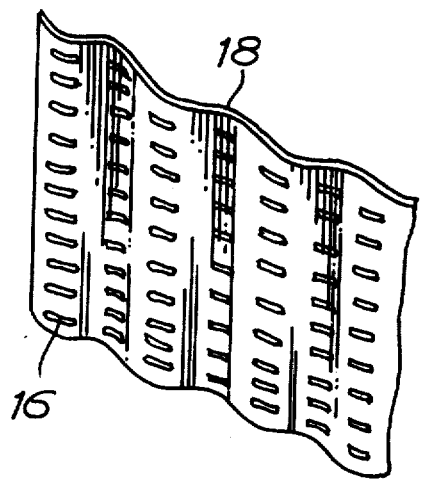

In FIGS. 8 and 9, a tank 23 has an inlet weir 24 and an outlet weir 25 communicating with an outlet channel 26. The tank 23 is also provided with a closable outlet 27. A compartment 28 is located in the tank 23 and has one wall abutting the weir 25. The base of the compartment 28 is a sheet perforate member 29 which is shown horizontal, but may if desired be inclined. The compartment is shown filled with a labyrinth of eddy-forming plates 30 which may be as shown in FIGS. 5 to 7, but tubes may be used instead. A decanting tray 31 provided with holes 32 communicates at one end with the weir 25. The direction of flow of the liquid through the tank 23, compartment 28 and decanting tray 31 is indicated by the arrows.

Five trials were carried out on upward flow clarification of the final effluent from a sewage disposal works using the apparatus of FIG. 1 except that in some of the trials, the perforate member or the labyrinth was omitted as indicated below. In all cases the labyrinth was formed from a material of the plastics class and the structure of the labyrinth was as indicated below. In the tables below "p.p.m." stands for parts per million. For all five trials a constant flow of 20 gls/ft.²/hr. was maintained. The effluent was taken from the outlet channel of a Dortmund humus tank.

Trial A

Labyrinth of FIG. 7 without perforate member.

| Hours run | Input Solids p.p.m. | Output Solids p.p.m. | % Reduction |
|---|---|---|---|
| 2 | 48 | 13.2 | 72.5 |
| 18 | 37.6 | 9.6 | 74.2 |

Trial B 0.25 mm. wedge wire perforate member plus labyrinth of FIG. 7.

| Hours run | Input Solids p.p.m. | Output Solids p.p.m. | % Reduction |
|---|---|---|---|
| 3 | 40.2 | 3.1 | 92.3 |
| 5 | 43.1 | 3.0 | 93.0 |
| 8 | 46.0 | 3.1 | 93.2 |

Trial C 0.25 mm. wedge wire perforate member only. No labyrinth.

| Hours run | Input Solids p.p.m. | Output Solids p.p.m. | % Reduction |
|---|---|---|---|
| 2 | 31.2 | 7.6 | 75.6 |
| 4 | 38.4 | 8.4 | 78.1 |
| 6 | 40.0 | 16.0 | 60.0 |
| 8 | 41.2 | 13.4 | 67.5 |

Trial D

Labyrinth formed from elements of FIG. 6. No perforate member.

| Hours run | Input Solids p.p.m. | Output Solids p.p.m. | % Reduction |
|---|---|---|---|
| 2 | 34.7 | 19.4 | 44.1 |
| 4 | 46.2 | 26.9 | 42.2 |
| 6 | 50.5 | 29.2 | 42.2 |

Trial E 0.25 mm. wedge wire perforate member plus labyrinth from elements of FIG. 6.

| Hours run | Input Solids p.p.m. | Output Solids p.p.m. | % Reduction |
|---|---|---|---|
| 2 | 30.0 | 10.8 | 64.0 |
| 4 | 33.6 | 7.2 | 78.6 |
| 6 | 65.2 | 12.8 | 80.4 |

The results of Trial A are superior to those of Trial D. The results of Trial B are superior to those of Trial A, C and E. Trial B gave the best solids reduction.

I claim:

1. An apparatus for reducing the solids content of a liquid phase such as sewage works effluent containing colloidal or gelatinous solids suspended therein, said apparatus comprising in combination, a sedimentation tank having an inlet and an outlet, wall means defining a separate chamber within the upper portion of said tank, a sheet perforate member mounted in a substantially horizontal position within said tank in vertically spaced relation to the bottom wall thereof and defining the bottom wall of said chamber, said outlet being located within said chamber whereby liquid flowing from said inlet to said outlet must pass upwardly through said sheet perforate member, and means defining a labyrinth mounted within said separate chamber between said sheet perforate member and said outlet whereby a liquid flowing from said sheet perforate member to said outlet must flow through said labyrinth, said means defining said labyrinth including a plurality of members mounted within said chamber and cooperating to define a plurality of fluid passages through which the liquid flows, said members having a plurality of rugosities thereon extending generally across the direction of flow for forming eddy currents in liquid flowing through said passages to thereby promote cavity sedimentation and adsorption of the solids from the liquid.

2. An apparatus as claimed in claim 1 in which the passages are inclined to one another.

3. An apparatus as claimed in claim 1 in which the passages are inclined with respect to the walls of the tank.

4. An apparatus as claimed in claim 1 in which the labyrinth is arranged so that when liquid flows through the tank from the inlet to the outlet, it passes through the labyrinth in a generally upward direction.

5. The apparatus as defined in claim 1 wherein said plurality of members comprises a plurality of plate-like members mounted in side-by-side relation and wherein at least alternate ones of said plate-like members have undulating cross sections.

6. An apparatus as claimed in claim 5 in which the plate-like and tube-like members of the labyrinth are secured together to form made-up units having a plurality of passages therein for the liquid.

7. The apparatus as defined in claim 1 wherein said plurality of members are elongated tube-like elements.

8. The apparatus defined in claim 7 wherein said tube-like elements have undulating cross sections.

9. In an apparatus for removing suspended solids from a liquid, said apparatus including a sedimentation tank having an inlet and an outlet, a liquid-solids separation device positioned within said tank and having means defining a plurality of fluid passages arranged in closely spaced relation, and means directing the liquid through said passages in its path from said inlet to said outlet, the improvement wherein said means defining said plurality of fluid passages comprises a plurality of plate-like members positioned in side-by-side relation, said plate-like members having longitudinally extending undulations formed therein to define said fluid passages, and a plurality of surface discontinuities in the form of a plurality of rugosities formed in said plate-like members spaced along said passages producing a non-uniform cross section along the length of said fluid passages, said surface discontinuities being capable of producing eddy currents within said fluid passages at flow rates therethrough in the low range of laminar flow to thereby produce separation of the suspended solids by cavity sedimentation and adsorption onto the surface of said fluid passages.

10. The apparatus defined in claim 9 wherein said plate-like members are secured together with the longitudinal undulations of alternate plate-like members being disposed at an angle with respect to one another.

11. In the operation of a system for reducing the solids content of a liquid colloidal solids suspended therein, including an upward flow sedimentation tank having an inlet and an outlet, a liquid-solids separation device having a plurality of fluid passages extending therethrough positioned within the tank, and means directing the liquid through the passages in said device in the liquid's path from the inlet to the outlet, the method comprising the steps of flowing said liquid through a sheet perforate member at a rate within the low range of laminar flow to produce a fluidized bed of flocculated particles on the downstream side of said sheet perforate member, flowing said liquid through said separation device at a flow rate in the low range of laminar flow within said fluid passages, and creating eddy currents in said liquid while passing through said fluid passages to produce cavity sedimentation and adsorption on the surface of said fluid passages.

12. The method defined in claim 11 wherein said sheet perforate member is positioned upstream from said separation device in said sedimentation tank.

13. The method defined in claim 11, wherein said separation device is positioned above said sheet perforate member, and wherein said liquid is caused to flow upward through said sheet perforate member then upward through said separation device.

14. The method defined in claim 13 wherein said liquid is sewage, works effluent.

* * * * *